(12) United States Patent
Yang (10) Patent No.: US 9,401,958 B2
(45) Date of Patent: Jul. 26, 2016

(54) METHOD, APPARATUS, AND SYSTEM FOR MIGRATING USER SERVICE

(71) Applicant: Huawei Technologies Co., Ltd., Shenzhen, Guangdong (CN)

(72) Inventor: Zhenzhang Yang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 181 days.

(21) Appl. No.: 14/215,337

(22) Filed: Mar. 17, 2014

(65) Prior Publication Data

US 2014/0201267 A1    Jul. 17, 2014

Related U.S. Application Data

(63) Continuation of application No. PCT/CN2011/079842, filed on Sep. 19, 2011.

(51) Int. Cl.
*H04L 29/08* (2006.01)
*H04L 29/06* (2006.01)
*H04W 4/00* (2009.01)
*G06F 11/20* (2006.01)

(52) U.S. Cl.
CPC .......... *H04L 67/1095* (2013.01); *G06F 11/203* (2013.01); *G06F 11/2028* (2013.01); *H04L 67/42* (2013.01); *H04L 69/162* (2013.01); *H04W 4/00* (2013.01); *G06F 11/2038* (2013.01); *G06F 11/2048* (2013.01)

(58) Field of Classification Search
CPC .............. G06F 11/203; G06F 11/2028; G06F 11/1402; H04L 67/42; H04L 69/162; H04L 69/40; H04L 67/12; H04L 47/125
USPC .......................... 709/203, 227, 229, 238, 239
See application file for complete search history.

(56) References Cited

U.S. PATENT DOCUMENTS

| | | | | |
|---|---|---|---|---|
| 7,818,454 | B2 * | 10/2010 | Kim .................. | H04L 29/12066 709/214 |
| 8,069,218 | B1 * | 11/2011 | Tormasov ............. | G06F 9/4856 709/212 |
| 8,244,864 | B1 * | 8/2012 | Bahl ..................... | H04L 67/148 709/225 |
| 2005/0262411 | A1 | 11/2005 | Vertes et al. | |

(Continued)

FOREIGN PATENT DOCUMENTS

| CN | 101179432 A | 5/2008 |
|---|---|---|
| CN | 101572709 A | 11/2009 |

(Continued)

*Primary Examiner* — Ruolei Zong (57) ABSTRACT

Embodiments of the present invention provide a method for migrating a user service, and relate to the field of communications, so that a user service is uninterrupted and service data of a user is not lost in a process of migrating an application program. The method includes: saving a user request link message sent by a client; after freezing an application program, saving socket status information corresponding to each current user link, and saving data packets in a socket input buffer and a socket output buffer that correspond to each current user link; and sending the user request link message to a standby server, so that the standby server generates a server socket according to the user request link message; and sending socket status information corresponding to the user link, and the data packets to the standby server, so that the standby server updates the server socket and buffer data.

12 Claims, 10 Drawing Sheets

(56) References Cited

U.S. PATENT DOCUMENTS

2007/0260920 A1 11/2007 Turner et al.
2015/0146539 A1* 5/2015 Mehta .................. H04L 47/125
                                              370/237

FOREIGN PATENT DOCUMENTS

| CN | 101876924 A | 11/2010 |
| EP | 1 231 756 A2 | 8/2002 |

* cited by examiner

METHOD, APPARATUS, AND SYSTEM FOR MIGRATING USER SERVICE

CROSS-REFERENCE TO RELATED APPLICATIONS

This application is a continuation of International Application No. PCT/CN2011/079842, filed on Sep. 19, 2011, which is hereby incorporated by reference in its entirety.

TECHNICAL FIELD

The present invention relates to the field of communications, and in particular, to a method, apparatus, and system for migrating a user service.

BACKGROUND

With rapid development of a current network, many conventional services have been transferred to a network environment for implementation. Due to vulnerability of the network environment, a server often needs to be maintained, thereby interrupting a user service. An existing high availability cluster server system includes at least two server nodes, and implements uninterrupted running for a long time through switching between a main server and a standby server.

During the implementation of the foregoing technical solution, the inventor finds that the prior art has at least the following problems: due to a limitation of a method for switching a user link, when an application program running on the main server is transferred to the standby server, the application program must be re-started on the standby server, so as to continue to provide external services. In a case in which the application program on the main server is closed, a communications link established between a client and the main server is disconnected, and at this time, a user may perceive interruption of the service. In addition, a data packet being transmitted between the client and the main server may be lost, thereby bringing great inconvenience to use of the user.

SUMMARY

Embodiments of the present invention provide a method, apparatus, and system for migrating a user service, so that in a process of migrating an application program, a user service is uninterrupted, and service data of a user is not lost.

To achieve the foregoing objectives, the embodiments of the present invention adopt the following technical solutions:

In one aspect, an embodiment of the present invention provides a method for migrating a user service, including:
  receiving a user request link message sent by a client, and establishing a user link according to the user request link message;
  saving the user request link message sent by the client;
  after freezing an application program, saving socket status information corresponding to each current user link, and saving data packets in a socket input buffer and a socket output buffer that correspond to each current user link, where the freezing an application program refers to suspending the application program when a user link needs to be migrated; and
  forwarding the user request link message to a standby server, so that the standby server generates a server socket according to the user request link message; and sending socket status information corresponding to the user link, and the data packets to the standby server, so that the standby server updates the server socket and buffer data, and completes user link migration.

In one aspect, an embodiment of the present invention further provides a method for migrating a user service, including:
  receiving, by a standby server, a user request link message, socket status information corresponding to a user link, and data packets in a socket input buffer and a socket output buffer that correspond to the user link, which are sent by a main server;
  establishing a link between the standby server and the user request link message sent by the main server, and generating a corresponding server socket;
  updating the server socket according to the socket status information sent by the main server; and
  updating buffer data according to the data packets in the socket input buffer and the socket output buffer that are sent by the main server, so as to complete a link with a client.

In another aspect, an embodiment of the present invention provides an apparatus for migrating a user service, including:
  a first message receiving unit, configured to receive a user request link message sent by a client, and establish a user link according to the user request link message;
  a request link message saving unit, configured to save the user request link message sent by the client;
  a related information storage unit, configured to: after freezing an application program, save socket status information corresponding to each current user link, and save data packets in a socket input buffer and a socket output buffer that correspond to each current user link, where the freezing an application program refers to suspending the application program when a user link needs to be migrated; and
  a stored information sending unit, configured to forward the user request link message to a standby server, and send socket status information corresponding to the user link, and the data packets to the standby server.

In another aspect, an embodiment of the present invention further provides an apparatus for migrating a user service, including:
  a second message receiving unit, configured to receive a user request link message, socket status information corresponding to a user link, and data packets in a socket input buffer and a socket output buffer that correspond to the user link, which are sent by a main server;
  a link establishing unit, configured to establish a link between a standby server and the user request link message sent by the main server, and generate a corresponding server socket;
  a socket updating unit, configured to update the server socket according to the socket status information sent by the main server; and
  a buffer updating unit, configured to update buffer data according to the data packets in the socket input buffer and the socket output buffer that are sent by the main server, so as to complete a link with a client.

In another aspect, an embodiment of the present invention provides a system for migrating a user service, including: the apparatus described above.

The embodiments of the present invention provide a method, apparatus, and system for migrating a user service. A user request link message, socket status information, and data packets in a socket input buffer and a socket output buffer on a main server are saved, and when an application program is started on a standby server, a user link is restored by using the saved user request link message and the saved socket status information, so that a user service is uninterrupted, and user experience is improved; buffer data is restored by using saved data in the socket buffers on the main server, so that service data is not lost, and communication reliability is improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following descriptions merely show some embodiments of the present invention, and a person of ordinary skill in the art may still derive other drawings from these accompanying drawings without creative efforts.

DETAILED DESCRIPTION

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
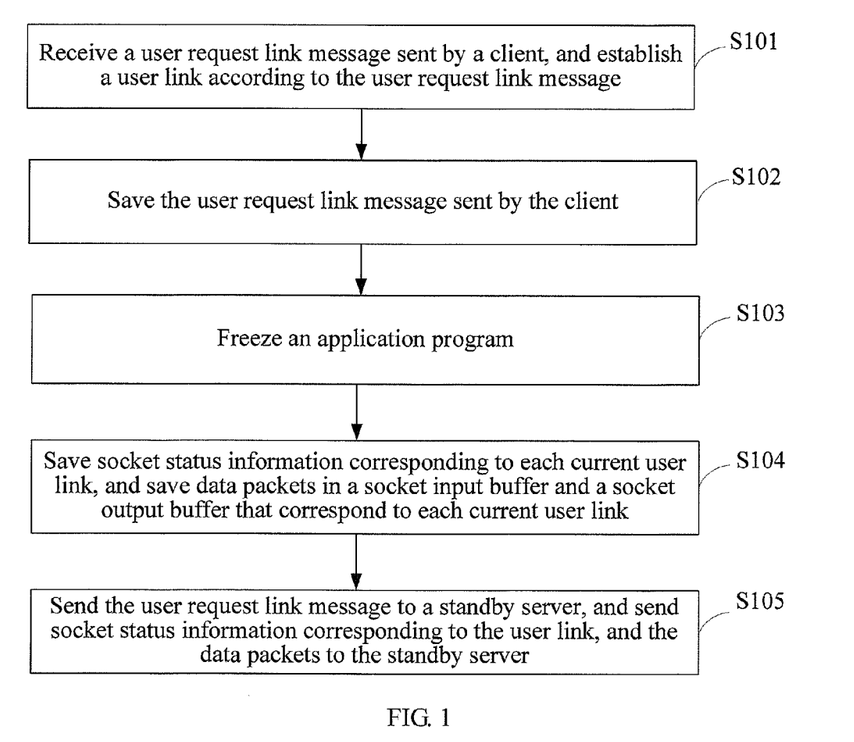
FIG. 1 is a flowchart of a method for migrating a user service on a main server side according to Embodiment 1 of the present invention.

The embodiment of the present invention provides a method for migrating a user service. The method is a method on a main server side during migration. As shown in FIG. 1, the method includes the following steps:

S101: Receive a user request link message sent by a client, and establish a user link according to the user request link message.

When needing to establish the link, the client sends the user request link message to a server, and establishes the user link with the server.

S102: Save the user request link message sent by the client.

The client sends the user request link message to request establishing a link, and a main server receives and saves the user request link message of the client.

S103: Freeze an application program.

The application program on the main server is frozen, so that the application program is suspended at a certain state, so as to subsequently save data and information on the main server.

S104: Save socket status information corresponding to each current user link, and save data packets in a socket input buffer and a socket output buffer that correspond to each current user link.

In an actual application, the saved socket status information and the saved data packets in the socket buffers are all saved in a preset link information file. It should be noted that the socket status information of the client on the main server, and the data packets in the socket buffers of the client on the main server are saved in the link information file, and may also be saved in another storage structure, which is not limited in the embodiment of the present invention.

S105: Forward the user request link message to a standby server, and send socket status information corresponding to the user link, and the data packets to the standby server.

The user request link message is sent to the standby server, so that the standby server can generate a server socket according to the user request link message; in addition, the socket status information, and the data packets in the socket input buffer and the socket output buffer are sent to the standby server, so that the standby server updates the server socket and buffer data.

Figure 2:
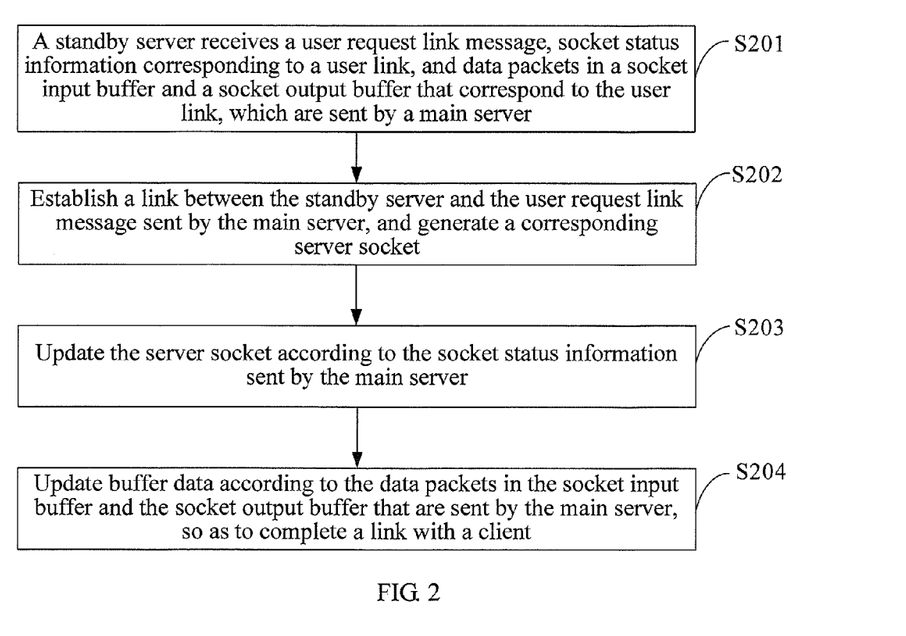
FIG. 2 is a flowchart of a method for migrating a user service on a standby server side according to Embodiment 1 of the present invention.

The embodiment of the present invention further provides a method for migrating a user service. The method is a method on a standby server side after migration. As shown in FIG. 2, the method includes the following steps:

S201: A standby server receives a user request link message, socket status information corresponding to a user link, and data packets in a socket input buffer and a socket output buffer that correspond to the user link, which are sent by a main server.

S202: Establish a link between the user request link message and the standby server, and generate a corresponding server socket.

The user request link message is read, and the link is established between the user request link message and the standby server, so that the standby server generates the corresponding server socket on the standby server according to the user request link message.

S203: The standby server updates the server socket according to the socket status information.

A server socket structure variable is updated according to the socket status information.

S204: The standby server updates buffer data according to the data packets in the socket input buffer and the socket output buffer, so as to complete a link with a client.

The embodiment of the present invention provides a method for migrating a user service. A user request link message, socket status information, and data packets in a socket input buffer and a socket output buffer on a main server are saved, and when an application program is started on a standby server, a link is restored by using the saved user request link message and the saved socket status information, so that a user service is uninterrupted, and user experience is improved; buffer data is restored by using the saved data in the socket buffers on the main server, so that service data is not lost, and communication reliability is improved.

Embodiment 2

Figure 3:
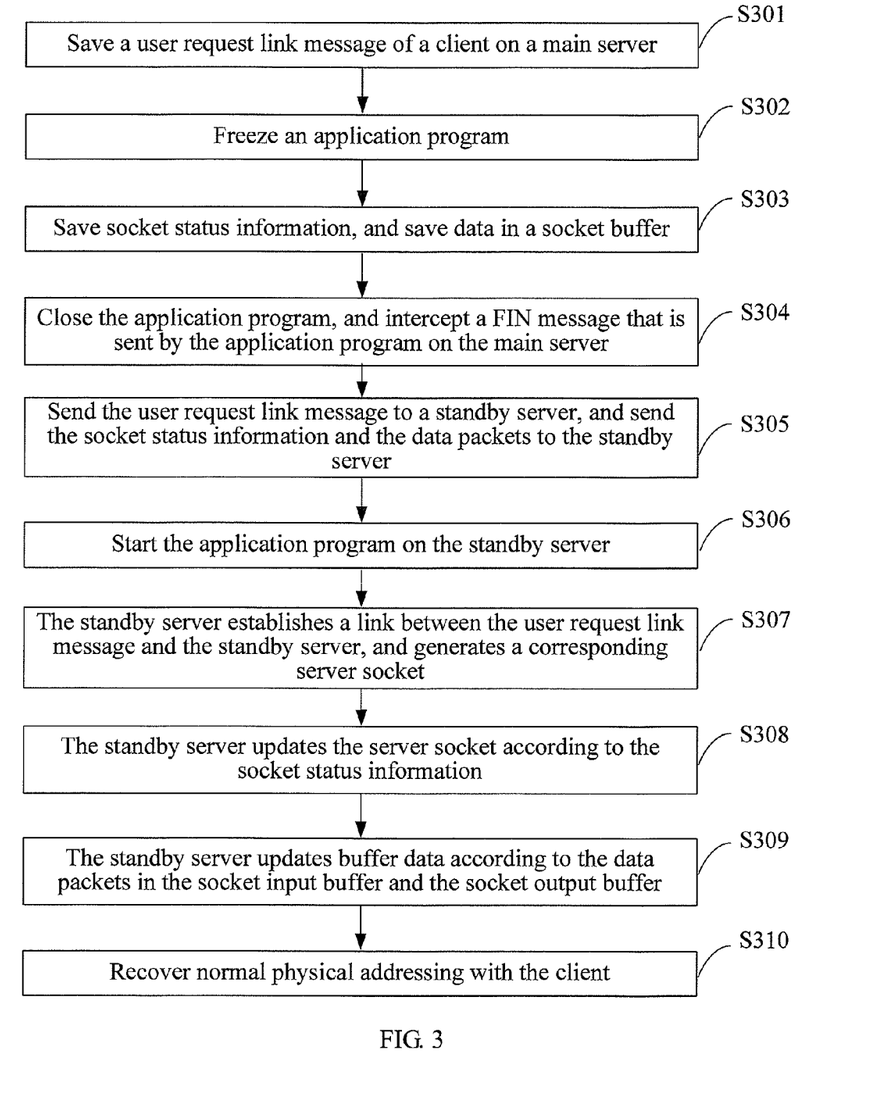
FIG. 3 is a flowchart of a method for migrating a user service according to Embodiment 2 of the present invention.

The embodiment of the present invention provides a method for migrating a user service. As shown in FIG. 3, the method includes the following steps:

S301: Save a user request link message of a client on a main server.

When a client requests establishing a user link, a user request link message of the client is saved in a request message linked list; if a client closes a socket of the client currently, a user request link message of the client that has closed the socket of the client is deleted from the request message linked list, so as to save storage space.

In an actual application, the saved user request link message may be saved in a preset request message linked list. It should be noted that, the user request link message of the client on the main server is saved in the request message linked list in this embodiment, and may also be saved in another storage structure, which is not limited in the embodiment of the present invention.

After step S301, when migration needs to be performed, step S302 is performed. Specifically, a migration instruction may be sent manually; certainly, the main server may perform detection voluntarily, and send a migration instruction when detecting that the main server satisfies a preset migration condition. For example, a migration condition may be set for the server, so that when the server is faulty, a migration instruction is sent automatically, thereby performing step S302.

S302: Freeze an application program.

The application on the main server is frozen, so that the application program remains a certain state, and data in a current communication state is replicated.

S303: Save socket status information, and save data in a socket buffer.

For each current link, socket status information corresponding to the link on the main server is copied, and for each existing link, data packets in a socket input buffer and a socket output buffer that correspond to the link on the main server are copied; the saved information is saved in a link information file, so that a user service is uninterrupted, and service data is not lost.

It should be noted that the socket status information of the client on the main server, and the data packets in the socket buffers of the client on the main server are saved in the link information file, and may also be saved in another storage structure, which is not limited in the embodiment of the present invention.

S304: Close the application program, and intercept a link closing message that is sent by the application program on the main server.

Specifically, the link closing message may be a FIN message used to notify the client of closing a link with the main server. By intercepting the link closing message, it can be prevented that the client performs an action of closing a link after receiving the link closing message, which interrupts the user service.

S305: Send the user request link message to a standby server, and send the socket status information and the data packets to the standby server.

In this embodiment, information saved on the main server needs to be sent to the standby server. In the embodiment of the present invention, the user request link message, the socket status information, and the data packets in the socket buffers may be selected to be sent to the standby server after the application program on the main server is closed, or after the user request link message, the socket status information, and the data packets in the socket buffers are saved and before the main server is closed, so as to restore a normal communications link, which is not limited in the embodiment of the present invention.

S306: Start the application program on the standby server.

HA (High Availability, high availability) software is used, so that the application program on the main server can be closed, and re-started on the standby server, and the standby server continues to provide external services.

S307: The standby server establishes a link between the user request link message and the standby server, and generates a corresponding server socket.

The user request link message in the request message linked list that is sent by the main server to the standby server is read to establish the link between the user request link message and the standby server, and generate the corresponding server socket on the standby server.

S308: The standby server updates the server socket according to the socket status information.

After the link is established according to S307, the socket status information sent by the main server to the standby server is read, a socket structure variable of each link is updated, that is, a server socket structure variable is updated, so that the standby server considers it as the user request link message sent by the client.

S309: The standby server updates buffer data according to the data packets in the socket input buffer and the socket output buffer.

Further, the data packets in the socket input buffer and the socket output buffer, which are sent by the main server to the standby server, are used to update data in the socket input buffer and the socket output buffer of each link, so that service data is not lost, and communication reliability is improved.

S310: Restore normal physical addressing with the client.

An ARP (Address Resolution Protocol, address resolution protocol), and an ARP buffer of a switch connected to the standby server may be refreshed.

Figure 4:
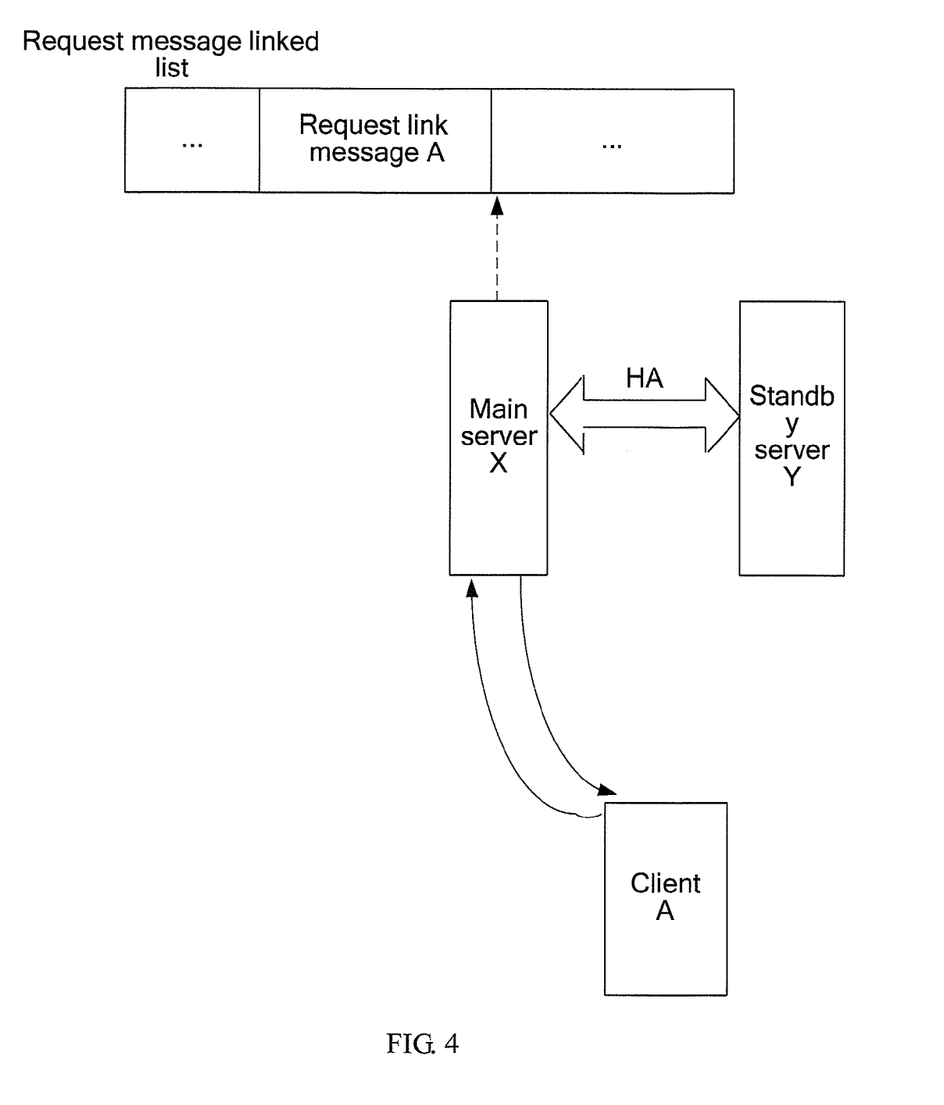
FIG. 4 is a schematic diagram showing addition of a user request link message to a request linked list and processing of an application program on a main server according to Embodiment 2 of the present invention.

In an actual application, the foregoing steps S301 to S305 may be performed in a manner shown in FIG. 4. In FIG. 4, the main server X is connected to a standby server Y, and the client A establishes a link with the main server X.

Specifically, when the client needs to establish a link, the main server X adds, to a request message linked list, the user request link message A sent by the client A to the main server X, and when the main server X determines that the client A has closed a socket of the client A, the main server X deletes the user request link message A of the client from the request message linked list. When the main server X determines that a communications link being performed on the main server X needs to be migrated to the standby server Y, the main server X freezes a current application program, and for each current link, saves socket status information corresponding to the link on the main server X, and for each existing link, saves data packets in a socket input buffer and a socket output buffer that correspond to the link on the main server X, and then closes a corresponding application program on the main server, and meanwhile intercepts a link closing message sent by an application program on the main server, so that it is prevented that the client performs an action of closing a link after receiving a link closing message, which causes service interruption. Then the main server X sends information saved on the main server X to the standby server Y, so as to restore a user link.

Figure 5:
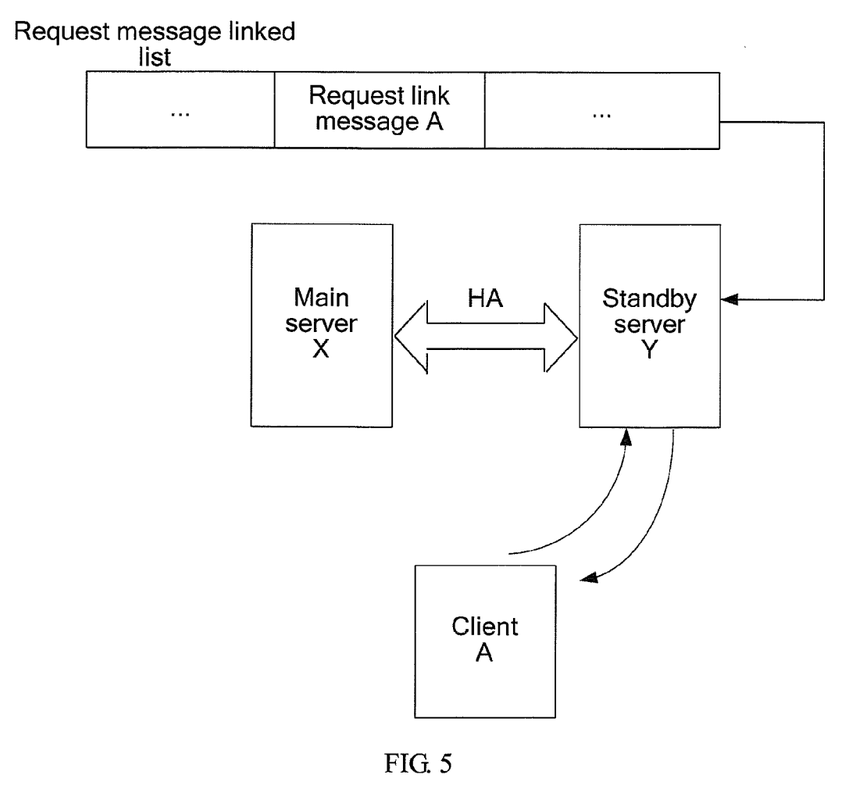
FIG. 5 is a schematic diagram showing restoration of a link on a standby server according to Embodiment 2 of the present invention.

In an actual application, the foregoing steps S306 to S310 may be performed in a manner shown in FIG. 5. In FIG. 5, the main server X is connected to a standby server Y, and the client A establishes a link with the standby server Y.

Specifically, the application program is restarted on the standby server Y by using the HA software, so that the standby server Y continues to provide a service for the client A. The saved request message linked list and the saved link information file are read from the standby server Y. By traversing the request message linked list, each user request link message is taken from the linked list, and a link is established between the user request link message and the standby server Y, so that the standby server Y considers the user request link message as a request message sent by the client A, and generates the corresponding server socket on the standby server Y. When the standby server Y has established a link with the client A, a socket structure variable of each link is updated by using the saved socket status information, that is, the server socket structure variable is updated. Then, data in the socket input buffer and the socket output buffer of each link is updated by using the saved data packets in the socket input buffer and the socket output buffer, so as to implement data restoration. Then, normal communication between the standby server and the client is implemented by restoring normal physical addressing with each client.

Direct switching of the application program between the main server and the standby server is implemented by using the foregoing steps, so that the user service is uninterrupted, and service data of a user is not lost, thereby solving the problems that after the current HA system migrates the application program as planned, the client can perceive the network interruption and the service data is lost due to network interruption. The user can continue communication without the need of re-establishing a link with the standby server.

In the method for migrating a user service provided in the embodiment of the present invention, a user request link message on a main server is saved, socket status information, and data packets in a socket input buffer and a socket output buffer are saved, an application program on the main server is closed, and the user request link message, the socket status information, and the data packets that are saved on the main server are sent to the standby server. After the application program is re-started on the standby server, a link is restored by using the saved user request link message and the saved socket status information, and a link closing message sent by the main server is intercepted to prevent the client from performing an action of closing a user link after receiving the link closing message, so that the user service is uninterrupted, and user experience is improved. Meanwhile, buffer data is restored by using the saved data in the socket buffers on the main server, so that service data is not lost, and communication reliability is improved. In addition, for the client that has closed the socket, the main server deletes a corresponding user request link message, thereby saving storage space, and improving a processing speed.

Embodiment 3

Figure 6:
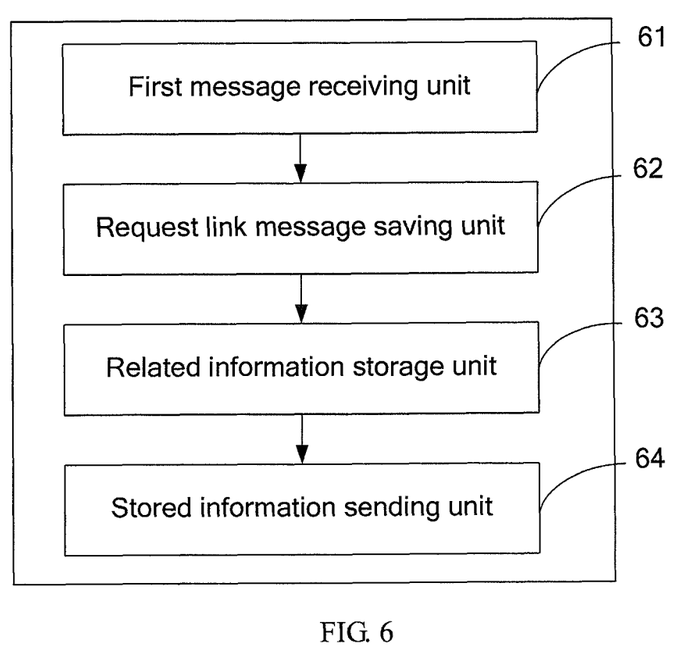
FIG. 6 is a block diagram of an apparatus for migrating a user service on a main server side according to Embodiment 3 of the present invention.

The embodiment of the present invention provides an apparatus for migrating a user service. As shown in FIG. 6, on a main server side, the apparatus includes a first message receiving unit 61, a request link message saving unit 62, a related information storage unit 63, and a stored information sending unit 64.

The first message receiving unit 61 is configured to receive a user request link message sent by a client, and establish a user link according to the user request link message.

The request link message saving unit 62 is configured to save the user request link message sent by the client.

In an actual application, the saved user request link message may be saved in a preset request message linked list. It should be noted that, the user request link message of the client on the main server is saved in the request message linked list in this embodiment, and may also be saved in another storage structure, which is not limited in the embodiment of the present invention.

The related information storage unit 63 is configured to: after freezing an application program, save socket status information corresponding to each current user link, and save data packets in a socket input buffer and a socket output buffer that correspond to each current user link.

It should be noted that the socket status information of the client on the main server, and the data packets in the socket buffers of the client on the main server are saved in a link information file, and may also be saved in another storage structure, which is not limited in the embodiment of the present invention.

The stored information sending unit 64 is configured to send the user request link message to a standby server, and send the socket status information and the data packets to the standby server.

Figure 7:
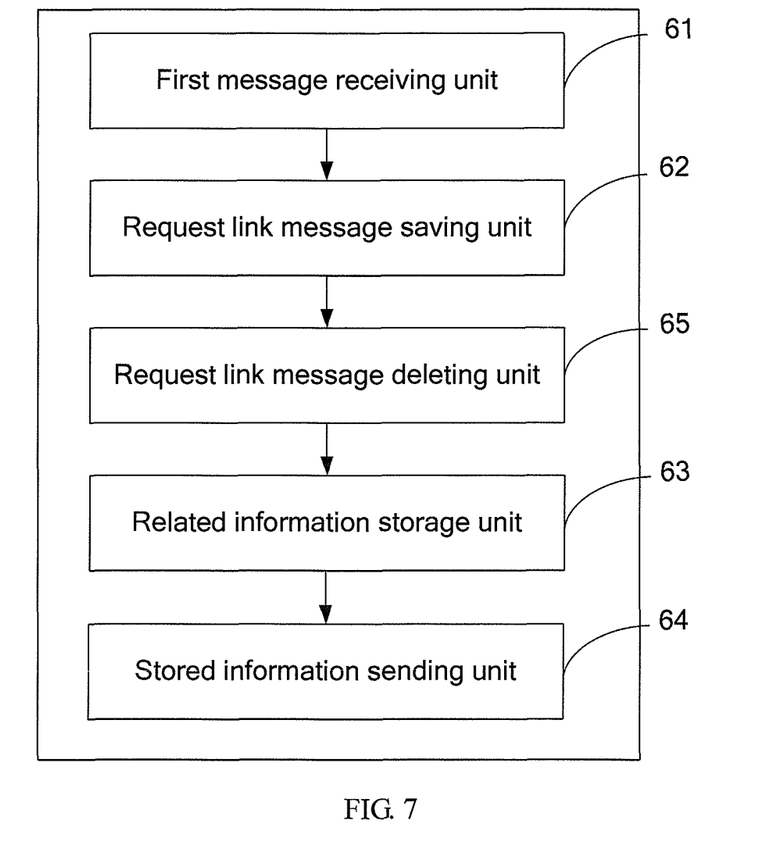
FIG. 7 is a block diagram of another apparatus for migrating a user service based on FIG. 6.

Further, as shown in FIG. 7, the apparatus further includes a request link message deleting unit 65.

The request link message deleting unit 65 is configured to: when the user link is disconnected, delete the saved user request link message corresponding to the user link.

Figure 8:
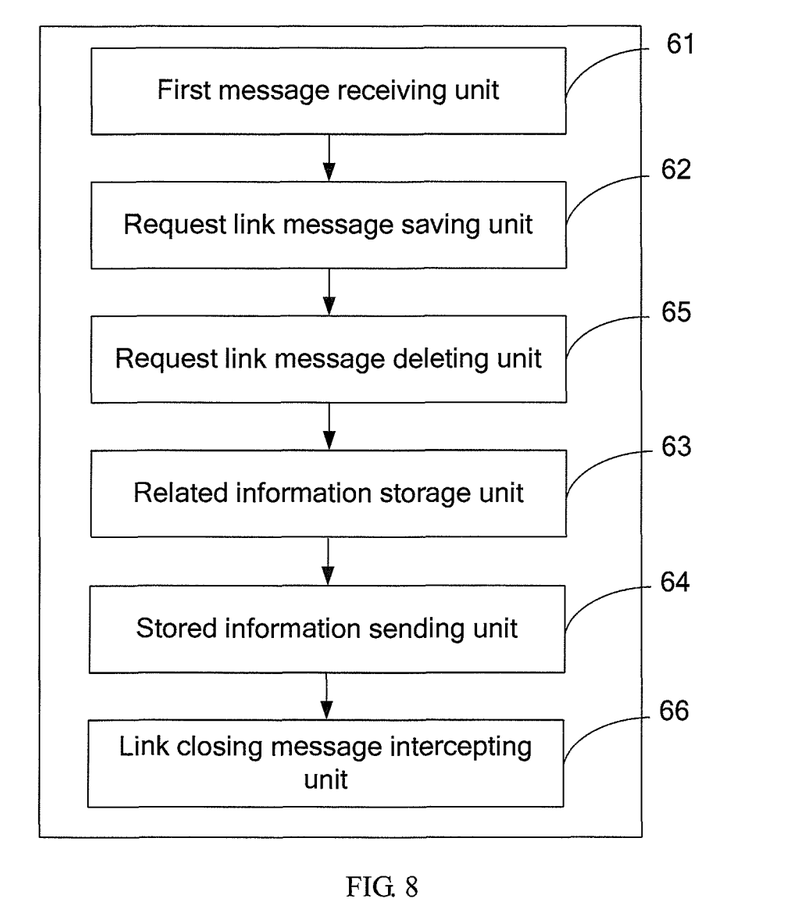
FIG. 8 is a block diagram of another apparatus for migrating a user service based on FIG. 7.

Further, as shown in FIG. 8, the apparatus further includes a link closing message intercepting unit 66.

The link closing message intercepting unit 66 is configured to: after the application program is closed, intercept a link closing message that is sent by the application program to the client, so as to prevent the client from closing the link.

Figure 9:
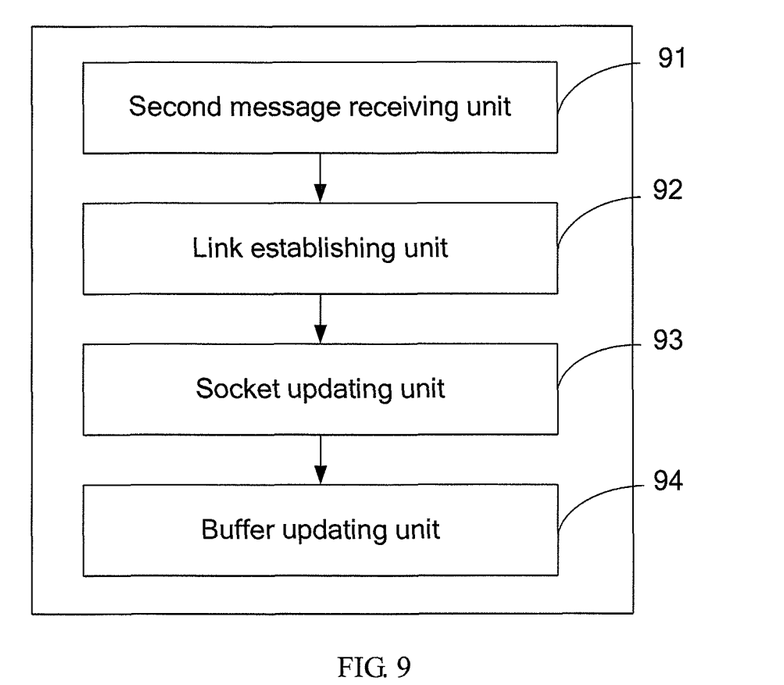
FIG. 9 is a block diagram of an apparatus for migrating a user service on a standby server side according to Embodiment 3 of the present invention.

In addition, as shown in FIG. 9, on a standby server side, the apparatus includes: a second message receiving unit 91, a link establishing unit 92, a socket updating unit 93, and a buffer updating unit 94.

The second message receiving unit 91 is configured to receive a user request link message, socket status information corresponding to a user link, and data packets in a socket input buffer and a socket output buffer that correspond to the user link, which are sent by a main server.

It should be noted that, the user request link message received by the second message receiving unit 91 on the standby server and the user request link message in the first message receiving unit 61 are the same user request link message.

The link establishing unit 92 is configured to establish a link between the standby server and the user request link message sent by the main server, and generate a corresponding server socket.

The socket updating unit 93 is configured to update the server socket according to the socket status information sent by the main server.

The buffer updating unit 94 is configured to update buffer data according to the data packets in the socket input buffer and the socket output buffer that are sent by the main server, so as to complete a link with a client.

Data in the socket input buffer and the socket output buffer of each link is updated by using the data packets in the socket input buffer and the socket output buffer, which are sent by the main server to the standby server, so that service data is not lost, and communication reliability is improved.

Figure 10:
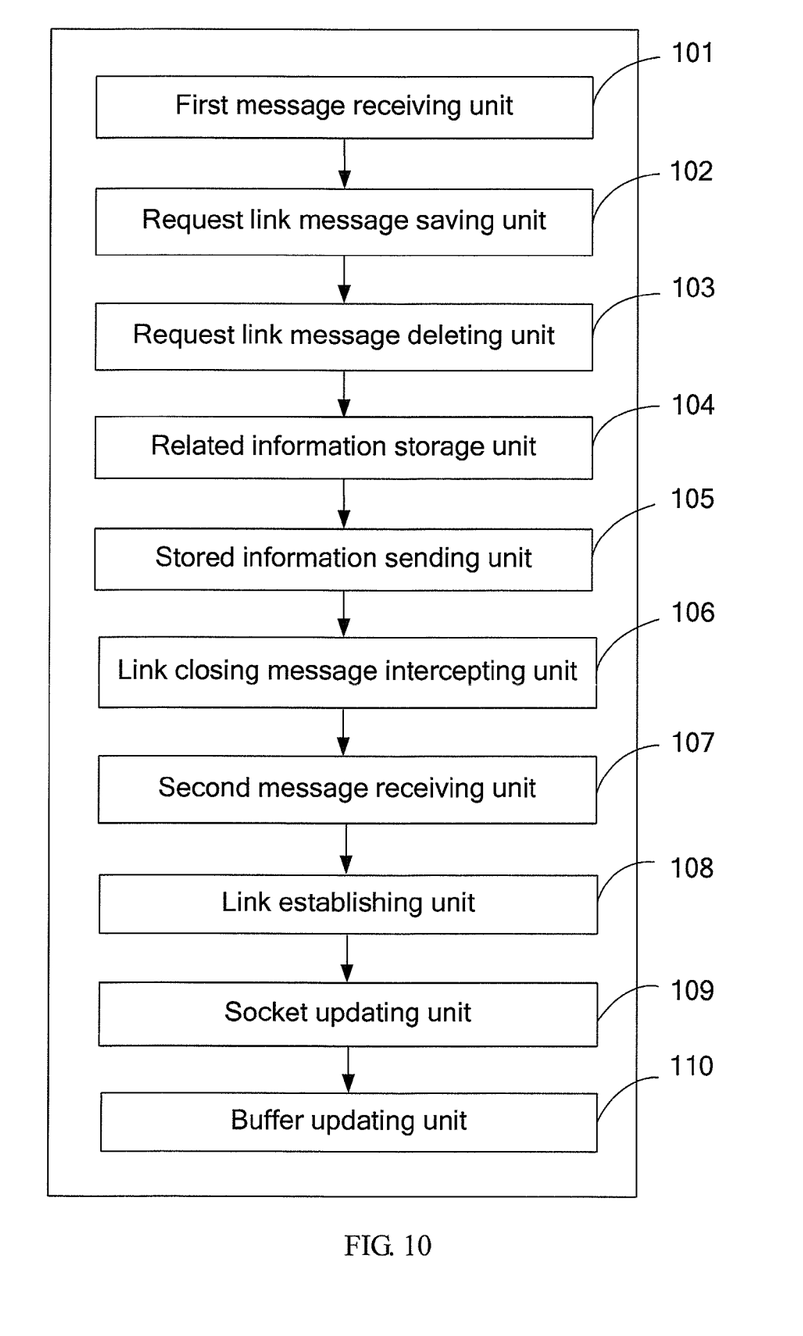
FIG. 10 is a block diagram of a system for migrating a user service according to Embodiment 3 of the present invention.

The embodiment of the present invention provides a system for migrating a user service. As shown in FIG. 10, the system is a combination of the apparatus on the main server shown in FIG. 8 and the apparatus on the standby server shown in FIG. 9.

It should be noted that, the system for migrating a user service may be any combination of any apparatus on the main server shown in FIG. 6 to FIG. 8 and the apparatus on the standby server shown in FIG. 9, and the embodiment of the present invention uses the combination of the apparatus shown in FIG. 8 and the apparatus shown in FIG. 9, which is not limited in the embodiment of the present invention.

In the apparatus and the system for migrating a user service provided in the embodiment of the present invention, when migration between a main server and a standby server needs to be performed, a user request link message on the main server is saved, socket status information, and data packets in a socket input buffer and a socket output buffer are saved, an application program on the main server is closed, and the user request link message, the socket status information, and the data packets that are saved on the main server are sent to the standby server. After the application program is started on the standby server, a link is restored by using the saved user request link message and the saved socket status information, and a link closing message sent by the main server is intercepted, so as to prevent the client from performing an action of closing a link after receiving the link closing message, so that the user service is uninterrupted, and user experience is improved. Meanwhile, buffer data is restored by using the saved data in the socket buffers on the main server, so that service data is not lost, and communication reliability is improved. In addition, for the client that has closed the socket, the main server deletes a corresponding user request link message, thereby saving storage space, and improving a processing speed.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for migrating a user link, the method comprising:
receiving a user request link message sent by a client, and establishing a user link according to the user request link message;
saving the user request link message sent by the client;
after freezing an application program, saving socket status information corresponding to each current user link, and saving data packets in a socket input buffer and a socket output buffer that correspond to each current user link, wherein the freezing an application program refers to suspending the application program when a user link needs to be migrated; and
forwarding the user request link message to a standby server, so that the standby server generates a server socket according to the user request link message; and sending socket status information corresponding to the user link, and the data packets to the standby server, so that the standby server updates the server socket and buffer data, and completes user link migration.

2. The method according to claim 1, further comprising:
when the client disconnects a user link with a main server, deleting the saved user request link message corresponding to the user link, so as to save storage space.

3. The method according to claim 1, further comprising:
after closing the application program, intercepting a link closing message that is sent by the application program to the client, so as to prevent the client from closing the user link.

4. A method for migrating a user service, the method comprising:
receiving, by a standby server, a user request link message, socket status information corresponding to a user link, and data packets in a socket input buffer and a socket output buffer that correspond to the user link, which are sent by a main server;
establishing a link between the standby server and the user request link message sent by the main server, and generating a corresponding server socket;
updating the server socket according to the socket status information sent by the main server; and
updating buffer data according to the data packets in the socket input buffer and the socket output buffer that are sent by the main server to the standby server, so as to complete a link with a client.

5. A computer system for migrating a user link, comprising:
a memory storage comprising instructions; and
one or more processors in communication with the memory, wherein the one or more processors execute the instructions to:
receive a user request link message sent by a client, and establish a user link according to the user request link message;
save the user request link message sent by the client;
after freezing an application program, save socket status information corresponding to each current user link, and save data packets in a socket input buffer and a socket output buffer that correspond to each current user link, wherein freezing the application program refers to suspending the application program when a user link needs to be migrated; and
forward the user request link message to a standby server, and send socket status information corresponding to the user link, and the data packets to the standby server.

6. The computer system according to claim 5, wherein the memory further comprises instructions and the one or more processors execute the instructions to:
delete the saved user request link message corresponding to the user link, so as to save storage space when the client disconnects a user link with a main server.

7. The computer system according to claim 5, wherein the memory further comprises instructions and the one or more processors execute the instructions to:
intercept a link closing message that is sent by the application program to the client, so as to prevent the client from closing the link after the application program is closed.

8. A computer system for migrating a user service, comprising:
a memory storage comprising instructions; and
one or more processors in communication with the memory, wherein the one or more processors execute the instructions to:
receive a user request link message, socket status information corresponding to a user link, and data packets in a socket input buffer and a socket output buffer that correspond to the user link, which are sent by a main server;

establish a link between a standby server and the user request link message sent by the main server, and generate a corresponding server socket;

update the server socket according to the socket status information sent by the main server; and update buffer data according to the data packets in the socket input buffer and the socket output buffer that are sent by the main server, so as to complete a link with a client.

9. A non-transitory computer-readable media storing computer instructions for migrating a user link, that when executed by one or more processors, cause the one or more processors to perform the steps of:

receiving a user request link message sent by a client, and establish a user link according to the user request link message;

saving the user request link message sent by the client;

after freezing an application program, saving socket status information corresponding to each current user link, and saving data packets in a socket input buffer and a socket output buffer that correspond to each current user link, wherein freezing an application program refers to suspending the application program when a user link needs to be migrated; and forwarding the user request link message to a standby server, and sending socket status information corresponding to the user link, and the data packets, to the standby server.

10. The non-transitory computer-readable media according to claim 9, further storing computer instructions that, when executed by one or more processors, cause the one or more processors to perform the steps of:

deleting the saved user request link message corresponding to the user link, so as to save storage space when the client disconnects a user link with a main server.

11. The non-transitory computer-readable media according to claim 9, further storing computer instructions that, when executed by one or more processors, cause the one or more processors to perform the steps of:

intercepting a link closing message that is sent by the application program to the client, so as to prevent the client from closing the link after the application program is closed.

12. A non-transitory computer-readable media storing computer instructions for migrating a user link, that when executed by one or more processors, cause the one or more processors to perform the steps of:

receiving a user request link message, socket status information corresponding to a user link, and data packets in a socket input buffer and a socket output buffer that correspond to the user link, which are sent by a main server;

establishing a link between a standby server and the user request link message sent by the main server, and generating a corresponding server socket;

updating the server socket according to the socket status information sent by the main server; and updating buffer data according to the data packets in the socket input buffer and the socket output buffer that are sent by the main server, so as to complete a link with a client.

\* \* \* \* \*